United States Patent [19]

Dejarnett

[11] 4,285,273

[45] Aug. 25, 1981

[54] MINI MODULE BUILDER

[76] Inventor: Donald W. Dejarnett, P.O. Box 569, Hale Center, Tex. 79041

[21] Appl. No.: 119,189

[22] Filed: Feb. 6, 1980

[51] Int. Cl.³ .................................................. B30B 1/32
[52] U.S. Cl. ...................................... 100/35; 100/100; 100/233; 100/255; 100/295; 296/56; 414/132
[58] Field of Search ............... 100/100, 233, 255, 295, 100/35; 414/491, 439, 132, 484; 56/344; 280/43.23; 296/56

[56] References Cited

U.S. PATENT DOCUMENTS

| | | | |
|---|---|---|---|
| 3,298,550 | 1/1967 | Schiltz | 414/491 |
| 3,437,033 | 4/1969 | Day | 100/295 X |
| 3,703,966 | 11/1972 | Jones | 100/100 |
| 3,749,003 | 7/1973 | Wilkes | 100/100 |
| 3,759,171 | 9/1973 | Vocker | 100/100 |
| 3,797,382 | 3/1974 | Muzzi | 100/100 |
| 3,879,049 | 4/1975 | Husky | 100/100 X |
| 4,031,003 | 6/1977 | Husky | 100/100 |
| 4,081,094 | 3/1978 | Pereira | 414/491 |

*Primary Examiner*—Billy J. Wilhite
*Attorney, Agent, or Firm*—Wendell Coffee

[57] ABSTRACT

Seed cotton is built into a module to be picked up and moved to a gin by dumping and tromping the cotton into a short box to form a first segment. After this first section of the module is formed the rear gate of the builder is opened and the box moved forward. Then, an additional segment is built, tramping the cotton of the additional segment into that of the segment already built. Then the box is again moved forward. After packing the first segment the rear gate remains open. The cotton is tramped with a pipe having a circular cross section for better packing. Weight is transferred from the tractor to the box while packing.

15 Claims, 5 Drawing Figures ated in the raised position with the back gate open with parts

MINI MODULE BUILDER

BACKGROUND OF THE INVENTION (1) Field of the Invention

This invention relates to crop handling methods and apparatus, and more particularly to temporarily storing seed cotton in a module.

(2) Description of the Prior Art

For many years harvested seed cotton was placed in a wagon to be carried to a gin. Sometimes when the harvesting proceeded at a rate faster than the cotton could be ginned it would be dumped on the ground to be picked up later.

JONES ET AL. U.S. Pat. No. 3,703,966 discloses a ricker for forming ricks of cotton upon the ground. The cotton was loaded from the ricks into wagons to be carried to the gin.

WILKES ET AL. U.S. Pat. No. 3,749,003 discloses a module builder by which the cotton could be compacted with sufficient compactness to be picked up as a unit and carried to the gin. Different methods of picking the cotton up and carrying it to the gin are shown in HUSKY U.S. Pat. No. 3,879,049, HUSKY U.S. Pat. No. 4,031,003 or the PEREIRA U.S. Pat. No. 4,081,094.

SUMMARY OF THE INVENTION (1) New and Different Function

I have invented an improved method and apparatus for building a module of cotton which may be picked up by equipment as shown by PEREIRA (above) or SCHILTZ U.S. Pat. No. 3,298,550.

I have invented a device which is much smaller than the module builder of WILKES ET AL. and, therefore, is easier to handle and move and costs less to construct. Specifically, The module Builder is a very short version of the WILKES ET AL. module builder with a simplier tramping system. It will be noted that WILKES ET AL., for his long module builder, requires a tramper mounted on the carriage which traverses the length of the module builder.

By using the short module builder I am able to mount a tramper which is pivoted at the front of the module builder thereby greatly simplifying construction and operation and reducing materials.

In operation the builder is moved forward, somewhat like the ricker of JONES ET AL.; but the cotton is sufficiently compacted and the segments bound together so that the entire finished module may be picked up with a module mover.

I have also improved the tramper foot which is in the form of a horizontal pipe with a circular cross section. When this pipe is pushed downward it buries into the cotton with some of the cotton sliding by the round pipe. Previously, a tramper foot having rectangular sharp edges was used which would not slide in the cotton and which was not as effective in tramping the cotton.

Also, since my invention has less weight I also provide special mechanism hitching the module builder to the tractor so that weight is transferred from the tractor to the module builder.

Furthermore, I have provided an improvement for unlatching the rear gate so that the rear gate is unlatched at any time the box is raised. This is by a simple mechanical connection between the wheel carriers and the latch bar.

Thus, it may be seen that the total function of the combination of the various elements of my invention far exceed the sum of the functions of the individual pipes, latches, struts, etc.

(2) Objects of this Invention

An object of this invention is to build a module of seed cotton.

Further objects are to achieve the above with a device that is sturdy, compact, durable, lightweight, simple, safe, efficient, versatile, ecologically compatible, energy conserving, and reliable, yet inexpensive and easy to manufacture, adjust, operate and maintain.

Other objects are to achieve the above with a method that is versatile, ecologically compatible, energy conserving, rapid, efficient, and inexpensive, and does not require highly skilled people to adjust, operate, and maintain.

The specific nature of the invention, as well as other objects, uses, and advantages thereof, will clearly appear from the following description and from the accompanying drawing, the different views of which are not necessarily scale drawings.

BRIEF DESCRIPTION OF THE DRAWINGS

FIG. 4 is a rear elevational view of the improved model with the back door closed as in the position for making the first segment and with parts broken away for clarity.

DETAILED DESCRIPTION OF THE PREFERRED EMBODIMENT

Figure 1:
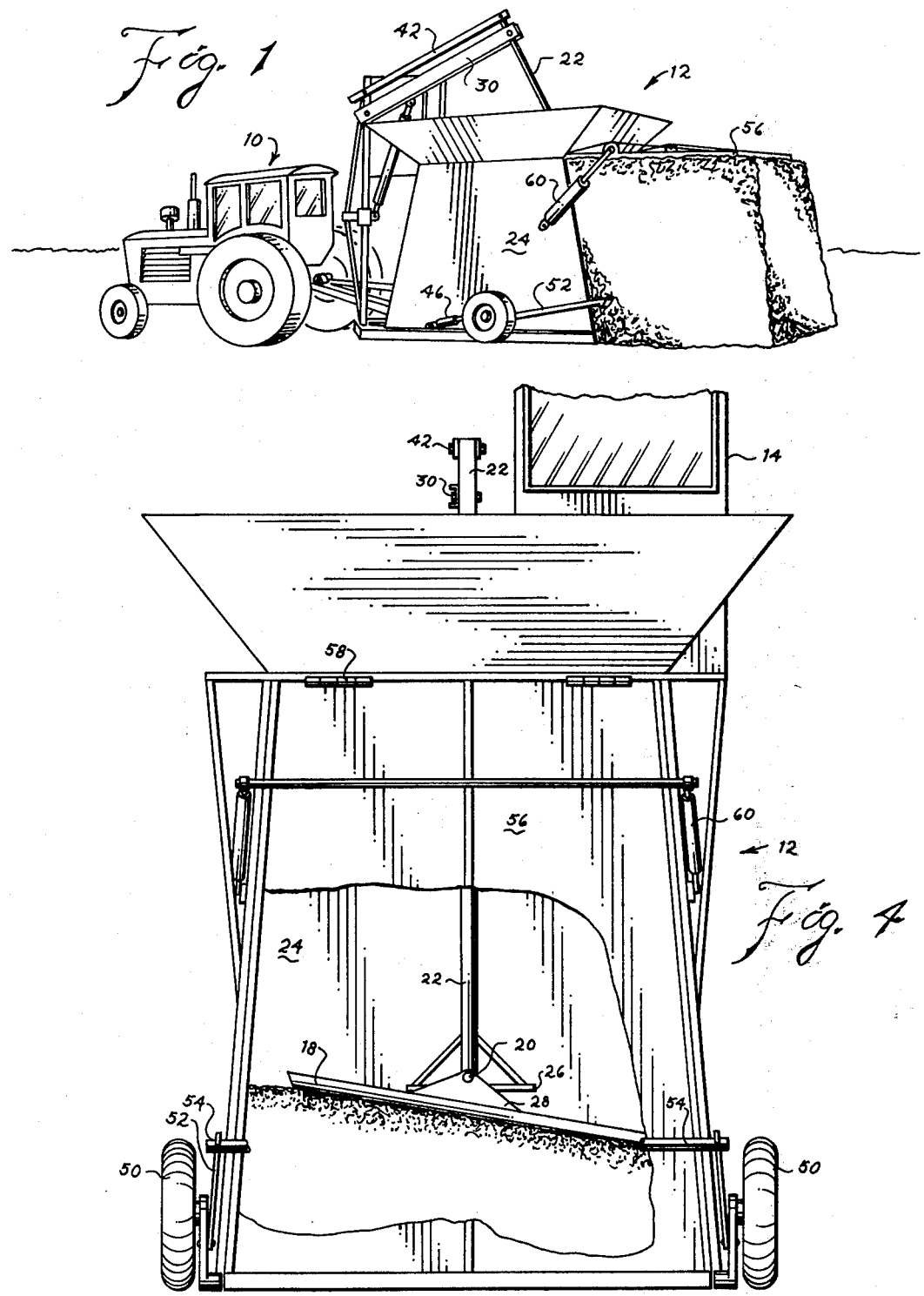
FIG. 1 is a perspective view of a first model of the invention attached to a tractor in the process of building one of the additional segments after the first segment has been built.

Referring to FIG. 1 there may be seen tractor 10 attached to module builder 12 according to my invention.

Tractor 10 furnishes hydraulic power to the module builder, locomotion to the module builder and also weight to be transferred to the module builder as will be explained later. The building of the module is primarily performed by an operator in cab 14 attached to the module builder. There, the operator operates valves (not shown) for controlling hydraulic fluid in pressure lines 16 which lead from the tractor 10 to the various hydraulic cylinders according to the control of the valves.

The lines to the various hydraulic cylinders by and through the valves which terminate in cab 14 are somewhat schematically shown inasmuch as those having ordinary skill in the art understand how to connect the hydraulic lines to the tractor as a source of hydraulic power and to the module builder 12 and also to control them by various valves to operate the various cylinders as will be explained.

To build the module one of the processes is to tramp the module. As may be seen, the tramping is performed by tramper foot or pipe 18 which is connected by pivot pin 20 onto the bottom of tramper leg 22. The tramper foot or pipe is pivoted about the axis of the pivot pin 20 which is horizontal and normal to the tramper pipe 18 which extends transversely across the box 24 of the module builder 12. The amount that the tramper pipe 18 can pivot is limited by the braced stop 26. It may be seen that when the tramper pipe 18 is horizontal the braced stop 26 is parallel to it.

Also, the pivot pin 20 extends through tramper ears 28 on the pipe 18 so that the tramper pipe 18 is placed below the braced stop 26. The tramper foot or pipe can tilt or angle as seen in FIG. 4 from side to side so that if the cotton is not level within the box 24. The amount that it can tilt or angle is limited by the braced stop 26 which is on the bottom of the tramper leg 22.

Figure 2:
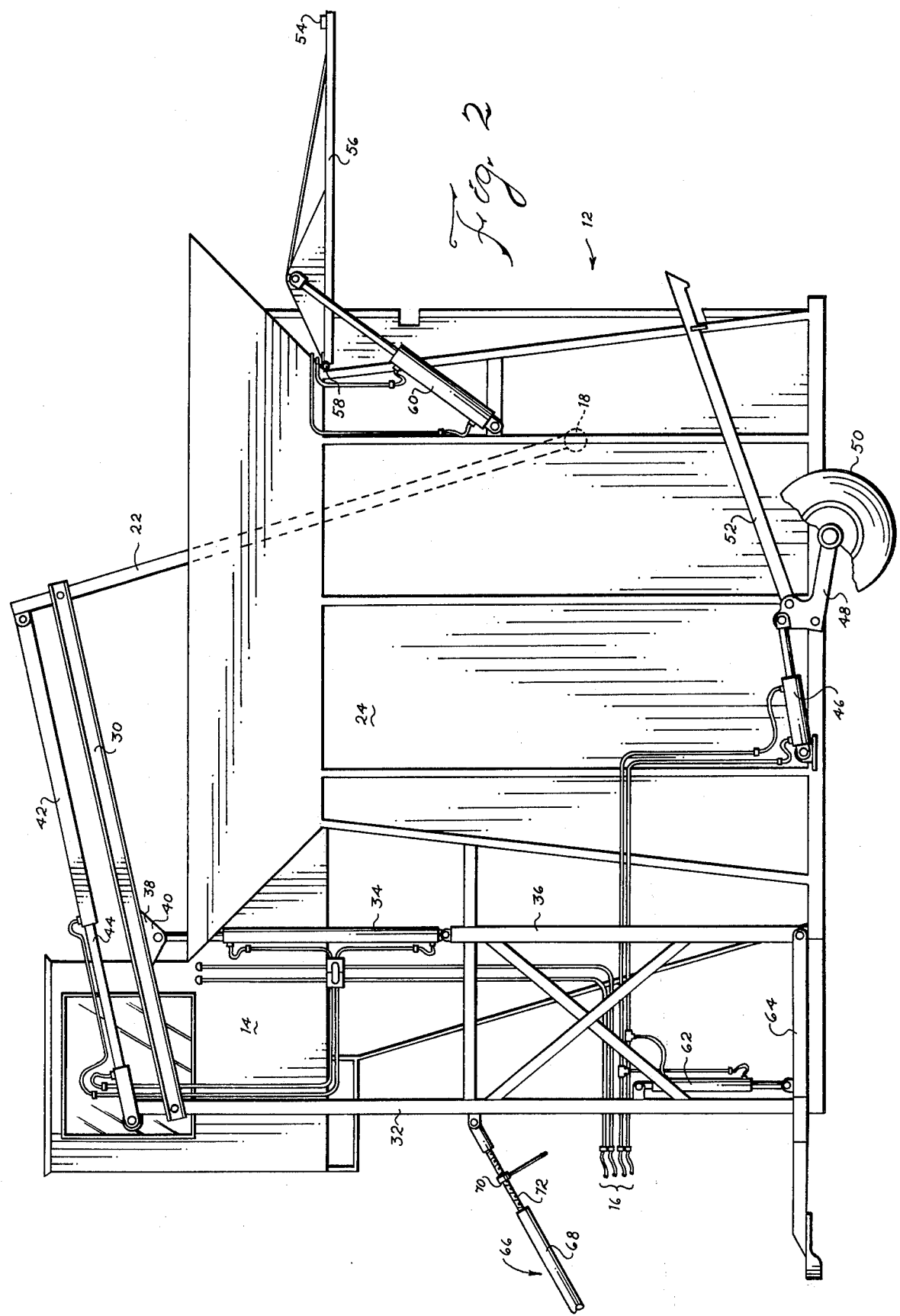
FIG. 2 is a left side elevation of an improved model in the raised position with the back gate open with parts broken away for clarity.

The tramper leg 22 is pivoted at the end of tramper boom 30. The boom 30 has one end pivoted to the tramper leg 22 and the other end pivoted to the tramper mast 32 as seen in FIG. 2. Main tramper cylinder 34 is a hydraulic cylinder having one end attached to framework 36 which is securely attached to the box 24 and its supporting structure. The cylinder 34 extends upward to pull point 38 by which it is pivoted. In the improved model the tramping cylinder 34 is nearly vertical as may be seen in FIGS. 2 and 3. Pull point 38 includes boom ears 40 attached to the tramper boom 30. By the expansion and contraction of the tramper cylinder 34 the tramper leg 22 and thus the tramper foot or pipe 18 will be vertically reciprocated thus tramping the cotton which has been dumped within the box 24.

The tramper leg 22 extends vertically above the pivoting point of the tramper boom 30 and is pivoted to positioning arm 42. The positioning arm 42 may be expanded or contracted by positioning cylinder 44. The other end of the positioning arm 42 is attached to the tramper mast 32 above the point where the tramper boom 30 is pivoted to the tramper mast. According to the amount of expansion or contraction of the positioning cylinder 44 the tramper pipe 18 may be positioned near the back of the box as seen in FIGS. 1 and 2 or near the front of the box, a position not seen in the drawings. It may be also appreciated that it is because of the shortness of the box 24 that this is possible. I.e., because the box is almost square in a plan view that by having the simple vertically pivoting boom 30 and positioning arm 42 that the tromper foot or pipe 18 can be positioned anywhere along the entire box 24. A trolley running along the top of the box is not necessary. The box 24 is about as wide as it is long.

After the first section has been thoroughly tramped to near the top of the box 24, the box is raised. By the actuation of the appropriate controls the wheel cylinder 46 is expanded. This causes rotation of wheel crank 48. The wheel crank 48 is in the form of a bell crank having two arms. The wheel crank 48 is pivoted at its center to the box 24. The wheel crank is pivoted to the framework 36 of the box 24 at about the bottom center of the box. Actuation of the wheel cylinder 46 against the short or upper arm of the wheel crank forces the wheels 50, journalled to the long arm of the wheel crank, downward which raises the box 24. Latch bar 52 is attached to the short arm of the wheel crank 48 adjacent to the connection of the wheel cylinder 46. Therefore, the expansion of the wheel cylinder 46 will extend the latch bar 52 rearwardly. Inasmuch as the latch bar angles upward and rearwardly, its movement rearwardly releases the latch bar 46 from cross bar 54 mounted upon rear gate 56. The rear gate is hinged by hinges 58 near the top of the box 24. Once the latch bar 52 is clear of the cross bar 54, expansion of the gate cylinder 60 will raise the gate 56 to the raised position, i.e., the position shown in FIGS. 1 and 2.

Hitch cylinder 62 is attached from the framework 36 to the hitch or tongue 64 of the module builder 12. At the same time that the wheels 50 are lowered thus raising the box, the hitch 64 is lowered which raises the front of the box 24. I.e., the front of the tongue or hitch 64 bears against the appropriate connection upon the tractor 10 and the downward movement raises the framework 36 of the box 24 and thus the box and the front of the module builder 12.

With the rear gate 56 open and the box 24 raised, the module builder 12 may be moved forward by the tractor 10. As is known to the prior art, the sides of the box 24 are tapered so that the elevation of the box 24 moves the sides of the box away from the segment of the module already built so that the builder 12 may be moved forward.

In this position and for normal operation, the box 24 will be moved a distance less than the length of the box. Then, the box is again set down upon the ground. To set it down the appropriate valve is activated to contract the hitch cylinder 62 and the wheel cylinder 46. The hitch cylinder 62 lifts upon the tractor 10 to transfer tractor weight to the front of the builder 12. The rear gate 56 is left open. Weight transfer strut or stiff strut 66 extends upward from the tractor 10 to the framework 36. When the box 24 is lowered into the position in FIG. 3, the sliding strut tube 68 of the strut 66 will contact the strut stop 70. With the strut 66 in compression if the rear of the box 24 would tend to rise off the ground pivoting about the front corner of the framework 36 of the box 24 this would tend to either elongate the tongue or hitch 64 or compress the strut 66. However, inasmuch as the strut stop 70 is against the strut tube 68, neither can occur and, therefore, weight is effectively transferred from the tractor 10 to the module builder 12. When the box 24 is raised the sliding strut tube 68 will slide away from the stop as seen in FIG. 2. The strut stop 70 is threaded to elongated bolt 72 which telescopes within the sliding tube 68. The bolt 72 is pivoted to the framework 36 while the sliding tube is pivoted to the tractor 10.

With the box 24 in the position to build the second segment of the module, additional cotton is dumped into the module builder 12, the cotton tramped with the tramper by reciprocating the tramper cylinder 34 and moving the tramper pipe 18 back and forth by the positioner cylinder 44. The cotton is tramped well into the segment previously made which in this case would be the first segment so that the two segments together form a single unit or module.

As soon as the cotton is tramped to the approximate top of the box 24 again the box is again raised by the lowering of the wheels 50 and the tongue 64, moved forward a distance less than the length of the box, again set down and another segment is tramped.

This process of adding additional segments to the first or original segment is continued until the desired segmental module length is made. Inasmuch as the equipment for moving the modules are built to handle a 36 foot module, normally it will continue until about a 36 foot segmental module is built or until all of the seed cotton in that area has been tramped into the module even though it might be less than the standard 36 feet. It will be understood that the module moving equipment can handle modules of shorter length than 36 feet but could not handle modules of substantially longer than the standard length.

Figure 3:
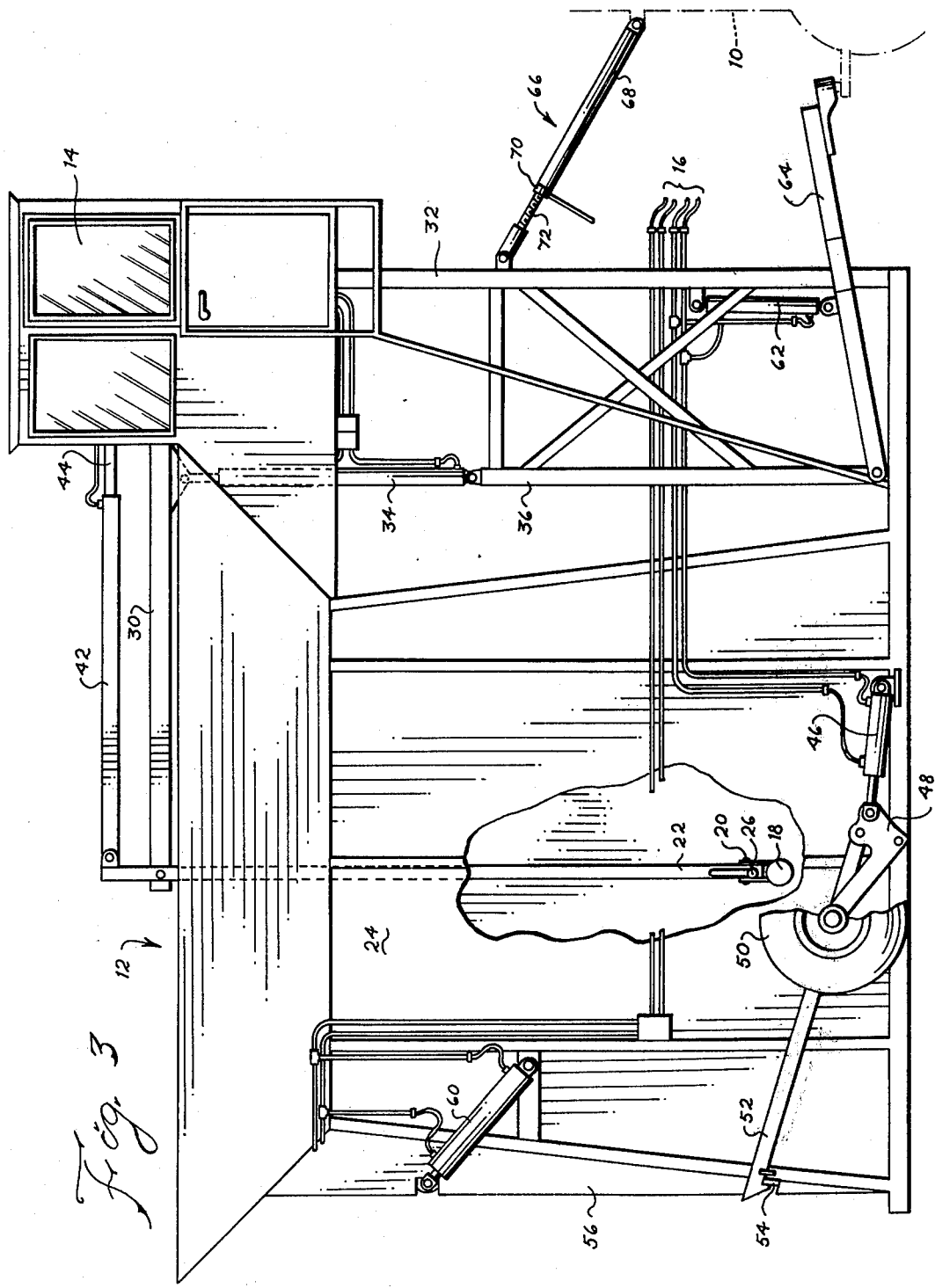
FIG. 3 is a right side elevational view of the improved model in the down position with the back gate closed as when making the first segment with parts broken away for clarity.

After the segmental module has been completed and the final segment made, the box 24 is again raised and the module builder 12 moved forward. However, it is this time moved a distance of whatever is desired to be placed where the next module is to be built. As soon as the rear gate 56 has cleared the finished module, it may be lowered by proper actuation of the gate cylinder 60. As the gate comes into the closed position it will come under the latch bar 54. Then, when the box is lowered for beginning a new module and the wheels 50 are raised thus lowering the box 24, the latch bar 52 will be moved into the full clamp position as seen in FIG. 3.

Figure 5:
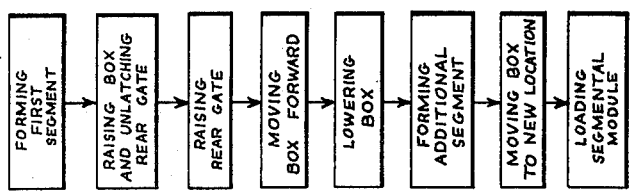
FIG. 5 is a schematic flow diagram showing the steps according to the method of this invention.

Thus, it may be seen that a self supporting, self contained, segmental module of seed cotton has been made. The sequence of operation may be seen in FIG. 5. First, the fresh seed cotton is compacted into a first segment of a module maker. Then the module maker is moved to a position less than the length of the box 24 which means the module builder is moved to a position that partially overlaps the first segment. Then, again freshly harvested seed cotton is compacted into the second segment by the module builder, thus the first and second segments are adhered together so that the segments form a single self supporting, self contained unit. The steps of moving the module maker forward and agains compacting freshly harvested seed cotton and adhering it together is continued until a module is made. Then, later the entire segmental module is loaded upon moving equipment as is known in the prior art.

When the rear gate 56 is closed, the module builder has a front, back and two sides but when the rear gate is open the module builder has a front and two sides but no back.

From the above, it may be seen that I have provided a very small, compact, inexpensive, lightweight module builder. This description is meant to instruct one having ordinary skill in the art how that my invention might be made and operated. Many details of construction which would be within the skill of those persons in the art have not been particularly pointed out or described. As previously stated, the connections of all of the hydraulic lines or valves have not been stated inasmuch as this would be within the skill. It will also be noticed that the cab has a ladder for the operator to ascend and descend from his operating position within the cab 14 and also the cab is mounted to one side so that it does not interfere with the movement of the tramping boom 30 which is approximately centered.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. The process of making a self supporting, self contained segmental module of seed cotton which is loaded as a self supported, self contained unit upon a module mover; wherein the improved method comprises:
   a. compacting freshly harvested seed cotton into a first segment of the module with a module maker, transfering weight from a tractor to the module maker to aid compacting,
   b. moving the module maker to a position which partially overlaps the first segment, then
   c. compacting as before freshly harvested seed cotton into a second segment of the module with the module maker, the first and second segments adhered together so that the segments together form a single self supported, self contained unit, and later
   d. loading said segmental module upon a module mover.

2. The invention as defined in limitations (a) through (d) of claim 1 further comprising:
   e. repeating the moving and again compacting steps as defined in limitations (b) through (c) above until a module of the desired length is built.

3. The invention as defind in limitations (a) through (d) of claim 1 further comprising:
   e. opening a rear gate in the module maker between the first compacting step defined in limitation (a) and the moving step defined in limitation (b).

4. The invention as defined in limitations (a) through (e) of claim 3 further comprising:
   f. repeating the moving and again compacting steps as defined in limitations (b) through (c) above until a module of the desired length is built.

5. The process involving a cotton module builder having:
   a. a tapered box,
   b. a rear gate hinged at its top to the box,
   c. a cross bar attached to the gate,
   d. a latch bar interconnecting with the cross bar to latch the rear gate closed,
   e. a wheel carrier on each side of the box,
   f. a wheel attached to each wheel carrier,
   g. actuation means interconnecting said box and wheel carrier for raising and lowering the wheels;
   wherein the improved method comprises:
   h. releasing the latch bar from the cross bar responsive to lowering the wheels.

6. The invention as defined in limitations (a) through (h) of claim 5 further comprising:
   i. mechanically actuating said latch bar responsive to downward movement of said wheel carrier.

7. In a cotton module builder having
   a. a tapered box having framework thereon,
   b. said box having a length and a width,
   c. wheels mounted for vertical motion on said box,
   d. a rear gate on said box so that the box may be opened at the rear,
   wherein the improvement comprises:
   e. said box being about as wide as it is long,
   f. a tramper mounted on said box having a boom pivoted to a mast,
   g. a leg and a foot depending from the end of the boom,
   h. means operatively connected to said leg for positioning said foot in said box, and
   i. means operatively connected to said boom for reciprocating said boom and thus vertically reciprocating said foot,
   j. a cross bar attached to the gate,
   k. a wheel carrier on each side of the box,
   l. one of said wheels attached to each wheel carrier, m. a latch bar attached to said wheel carrier,
n. said latch bar extending rearward to said cross bar on said gate,
o. so arranged and constructed that the latch bar release the cross bar on the gate responsive to the lowering of the wheels.

8. The invention as defined in limitations (a) through (o) of claim 7 further comprising:
p. said wheel carrier in the form of a bell crank having two arms pivoted at its center to the box,
q. said wheel attached to one arm of said bell crank,
r. said actuating means attached to the other arm of said bell crank, and
s. said latch bar attached to said other arm of said bell crank.

9. In a cottom module builder having
a. a tapered box having framework thereon,
b. said box having a length and a width,
c. wheels mounted for vertical motion on said box,
d. a rear gate on said box so that the box may be opened at the rear,
wherein the improvement comprises:
e. said box being about as wide as it is long,
f. a tramper mounted on said box having a boom pivoted to a mast,
g. a leg and a foot depending from the end of the boom,
h. means operatively connected to said leg for positioning said foot in said box,
i. means operatively connected to said boom for reciprocating said boom and thus vertically reciprocating said foot,
j. the rear gate hinged at its top to the box,
k. a wheel carrier on each side of the box,
l. one of said wheels attached to each wheel carrier,
m. actuating means interconnecting the wheel carrier and box for raising and lowering the wheels;
n. a tongue pivoted to the forward end the framework,
o. hydraulic cylinder interconnecting the tongue and framework for raising and lowering the front of the tongue,
p. a strut pivoted from the framework of the box so that the strut is adapted to be attached to a tractor to which the tongue is attached, so constructed and arranged that lifting the box also lifts the tractor.

10. The invention as defined in limitations (a) through (p) of claim 9 further comprising:
q. said foot being an elongated bar having an arcuate cross section and extending in a horizontal position traversly of the box.

11. The invention as defined in limitations (a) through (q) of claim 10 further comprising:
r. a cross bar attached to the gate,
s. a latch bar attached to said wheel carrier,
t. said latch bar extending rearward to said cross bar on said gate,
u. so arranged and constructed that the latch bar releases the cross bar on the gate responsive to the lowering of the wheels.

12. In a cotton module builder having
a. a tapered box,
b. a rear gate hinged at its top to the box,
c. a cross bar attached to the gate,
d. a wheel carrier on each side of the box,
e. a wheel attached to each wheel carrier,
f. actuating means innerconnecting said box and wheel carrier for raising and lowering the wheels;
wherein the improvement comprises:
g. a latch bar attached to said wheel carrier,
h. said latch bar extending rearward to said cross bar on said gate,
i. so arranged and constructed that the latch bar releases the cross bar on the gate responsive to the lowering of the wheels.

13. The invention as defined in limitations (a) through (i) of claim 12 further comprising:
j. said wheel carrier in the form of a bell crank having two arms pivoted at its center to the box,
k. said wheel attached to one arm of said bell crank,
l. said actuating means attached to the other arm of said bell crank, and
m. said latch bar attached to said other arm of said bell crank.

14. In a cotton module builder having
a. a tapered box,
b. framework attached to the box,
c. a rear gate hinged at its top to the box,
d. a wheel carrier on each side of the box,
e. a wheel attached to each wheel carrier,
f. actuating means interconnecting the wheel carrier and box for raising and lowering the wheels;
wherein the improvement comprises:
g. a tongue is pivoted to the forward end the framework,
h. a hydraulic cylinder interconnects the tongue and framework for raising and lowering the front of the tongue, and
i. a strut is pivoted from the framework of the box and is adapted to be attached to a tractor to which the tongue is attached, so constructed and arranged that lifting the box also lifts the tractor.

15. The invention as defined in limitations (a) through (i) of claim 14 further comprising:
j. said strut including a sliding tube telescoped over an elongated threaded bolt,
k. said bolt is pivoted to the framework of said box,
l. said tube adapted to be pivoted to the tractor, and
m. a stop threaded onto said elongated bolt to adjust the minimum length of said strut.

* * * * *